(12) United States Patent
Choi et al.

(10) Patent No.: US 7,173,366 B2
(45) Date of Patent: Feb. 6, 2007

(54) FIELD EMISSION DISPLAY HAVING CARBON NANOTUBE EMITTER AND METHOD OF MANUFACTURING THE SAME

(75) Inventors: Jun-Hee Choi, Suwon-si (KR); Andrei Zoulkarneev, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 10/916,616

(22) Filed: Aug. 12, 2004

(65) Prior Publication Data
US 2005/0035701 A1    Feb. 17, 2005

(30) Foreign Application Priority Data
Aug. 12, 2003    (KR) .................. 10-2003-0055883

(51) Int. Cl.
   H01J 9/12      (2006.01)
   H01J 1/62      (2006.01)
   H01J 19/06     (2006.01)
   H01J 1/02      (2006.01)
   H01J 1/00      (2006.01)

(52) U.S. Cl. .................. 313/495; 313/309; 313/351; 313/311; 313/495; 445/51; 445/49

(58) Field of Classification Search .............. 313/495, 313/306
   See application file for complete search history.

(56) References Cited

U.S. PATENT DOCUMENTS

| | | | | |
|---|---|---|---|---|
| 5,955,850 A | * | 9/1999 | Yamaguchi et al. | 313/495 |
| 5,973,444 A | * | 10/1999 | Xu et al. | 313/309 |
| 6,016,185 A | * | 1/2000 | Cullman et al. | 355/52 |
| 6,599,847 B1 | * | 7/2003 | Jang et al. | 438/787 |
| 6,935,915 B2 | * | 8/2005 | Park et al. | 445/24 |
| 2003/0113450 A1 | * | 6/2003 | Park et al. | 427/255.28 |
| 2003/0141495 A1 | * | 7/2003 | Lee et al. | 257/10 |
| 2005/0067937 A1 | * | 3/2005 | Sheu et al. | 313/309 |
| 2005/0133779 A1 | * | 6/2005 | Choi et al. | 257/10 |
| 2005/0139817 A1 | * | 6/2005 | Choi et al. | 257/10 |

FOREIGN PATENT DOCUMENTS

KR    2001029763 A  *  4/2001

* cited by examiner

*Primary Examiner*—Nimeshkumar D. Patel
*Assistant Examiner*—Natalie K. Walford
(74) *Attorney, Agent, or Firm*—Robert E. Bushnell, Esq.

(57) ABSTRACT

Provided is a field emission display (FED) with a carbon nanotube emitter and a method of manufacturing the same. A gate stack that surrounds the CNT emitter has a mask layer that covers an emitter electrode adjacent to the CNT emitter, and a gate insulating film, a gate electrode, a focus gate insulating film ($SiO_x$, $X<2$), and a focus gate electrode formed on the mask layer. The focus gate insulating film has a thickness 2 μm or more, and preferably 3~15 μm and is preferably made using PECVD. A flow rate of silane and nitric acid for forming the focus gate insulating film and/or the gate insulating film are maintained at 50~700 sccm and 700~4,500 sccm, respectively. By doing so and by making the oxide thick, the oxide is less apt to crack and thus less apt to generate a leakage current.

24 Claims, 18 Drawing Sheets

FIELD EMISSION DISPLAY HAVING CARBON NANOTUBE EMITTER AND METHOD OF MANUFACTURING THE SAME

CLAIM OF PRIORITY

This application makes reference to, incorporates the same herein, and claims all benefits accruing under 35 U.S.C. §119 from an application for FIELD EMISSION DISPLAY HAVING CARBON NANOTUBE EMITTER AND METHOD OF MANUFACTURING THE SAME earlier filed in the Korean Intellectual Property Office on 12 Aug. 2003 and there duly assigned Serial No. 2003-55883.

BACKGROUND OF THE INVENTION

1. Field of the Invention

The present invention relates to a flat display panel and a method of manufacturing the same, and more particularly, to a field emission display having a carbon nanotube emitter and a method of manufacturing the same.

2. Description of the Related Art

It is readily predicted that cathode ray tubes will be superseded by flat display panels such as liquid displays, light emitting diodes, plasma display panels, and field emission displays (FED). Among these, the FED, which has advantages of high resolution, high efficiency, and low power consumption, receives much attention as a display device for the next generation.

A core technology of the FED is a processing technique of an emitter tip for emitting electrons and a stability of the processing technique. In a FED, the emitter tip is made out of either silicon or molybdenum. However, both silicon tips and molybdenum tips have short lifetimes, low stability, and low electron emission efficiency.

However, insulation layers in FED's are often subject to cracking, leading to leakage current and thus degrading the performance of the FED. Therefore, what is needed is an improved design for an FED that improves the emitter tip and improves the gate stack.

SUMMARY OF THE INVENTION

It is therefore an object of the present invention to provide an improved design for an FED.

It is also an object of the present invention to provide a novel method for making the improved FED.

It is still an object of the present invention to provide an FED with an improved emitter structure.

It is also an object of the present invention to provide a novel structure for an insulating layer between a pair of electrodes.

It is further an object of the present invention to provide a method for making the FED with the novel emitter and the novel insulating layer that is simplified and minimizes costs.

These and other objects can be achieved by an FED with an emitter made out of carbon nanotubes and an interlayer insulator with no cracks and no leakage current that provides a superior ability of focusing an electron beam. The novel FED has a glass substrate, a transparent electrode formed on the glass substrate that serves as the emitter electrode, a CNT emitter formed on the transparent electrode, a gate stack that extracts an electron beam from the CNT emitter, focuses the extracted electron beam to a predetermined target, and is formed on peripheral area of the CNT emitter, a front panel that is formed above the gate stack and on which an information is displayed, and a fluorescent film formed on a back surface of the front panel, where the gate stack includes a mask layer that covers the transparent emitter electrode and a gate insulating film, a gate electrode, a focus gate insulating film($SiO_x$, x<2), and a focus gate electrode sequentially stacked on the mask layer. The gate insulating film may be a $SiO_2$ or another silicon oxide film given by a $SiO_x$, where X<2. A thickness of the focus gate insulating film may be 2 μm or more, preferably 3~15 μm, and more preferably 6~15 μm and the gate insulating film may have a thickness of 1~5 μm. A plurality of CNT emitters may be formed to correspond to a single focus gate electrode.

According to an aspect of the present invention, there is provided a method of manufacturing a CNT FED of the present invention; the process involves forming a mask layer perforated by a through hole that exposes a portion of the transparent electrode on the glass substrate, forming a gate insulating film that fills the through hole in the mask layer, forming a gate electrode on the gate insulating film about the through hole, forming a focus gate insulating film ($SiO_x$, x<2) on the gate electrode and the gate insulating film, forming a focus gate electrode on the focus gate insulating film about the through hole, and removing the gate insulating film and the focus gate insulating film disposed within the gate electrode.

The gate insulating film may be formed using one of a silicon dioxide film and a second silicon oxide film given by the $SiO_x$, where X<2. The focus gate insulating film is formed to a thickness of 2 μm or more, preferably 3~15 μm, and more preferably 6~15 μm.

The focus gate insulating film is preferably formed using plasma enhanced chemical vapor deposition (PECVD). A flow rate of silane ($SiH_4$) for forming the focus gate insulating film may be maintained at 50~700 sccm, and a flow rate of nitric acid ($N_2O$) for forming the focus gate insulating film may be maintained at 700~4,500 sccm. The process pressure for forming the first silicon oxide film may be maintained at 600~1,200 mTorr, and a temperature of the substrate may be maintained at 250~450° C. while forming the focus gate insulating film. Also, an RF power may be maintained at 100~300 W while forming the focus gate insulating film. The above process conditions can also be applied to a process for forming the gate insulating film.

Forming a hole through the focus gate insulating film can be achieved by coating a photosensitive film on the focus gate electrode and the focus gate insulating film formed within the focus gate electrode, exposing the photosensitive film formed above the through hole, removing the exposed portion of the photosensitive film, wet etching the focus gate insulating film using the photosensitive film from which the exposed portion is removed as an etch mask, and removing the photosensitive film. In this case, the whole process for removing the focus gate insulating film may be repeated. The photosensitive film may be exposed by illuminating ultra violet rays from below the glass substrate during the exposing the photosensitive film.

Exposing the photosensitive film can be achieved by arranging a mask having a transmission window to a region corresponding to the through hole over the photosensitive film, and irradiating lights toward the mask from above the mask.

All of processes associated with perforating or removing the focus gate insulating film can also be applied to a process for perforating or removing the gate insulating film. In addition, the above process can be repeated up to four times to achieve perforation. The focus gate electrode may be formed so that a plurality of through holes are formed in the focus gate electrode.

The CNT FED according to the present invention includes a focus gate insulating film by which an excellent step coverage is secured between the focus gate electrode and the gate electrode and which has enough thickness to minimize stresses between the focus gate electrode and the gate electrode. Therefore, defects such as cracks are not generated in the focus gate insulating film, thereby reducing leakage current between the focus gate electrode and the gate electrode. Since the focus gate insulating film is sufficiently thick, the focus gate electrode and the gate electrode are separated by an enough distance. Therefore, an insulation breakage between two electrodes by impurities adhered to in the focus gate insulating film can be avoided. Also, a manufacturing process can be simplified because the photosensitive film is patterned by self-aligning instead of using an additional mask, thereby reducing manufacturing costs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
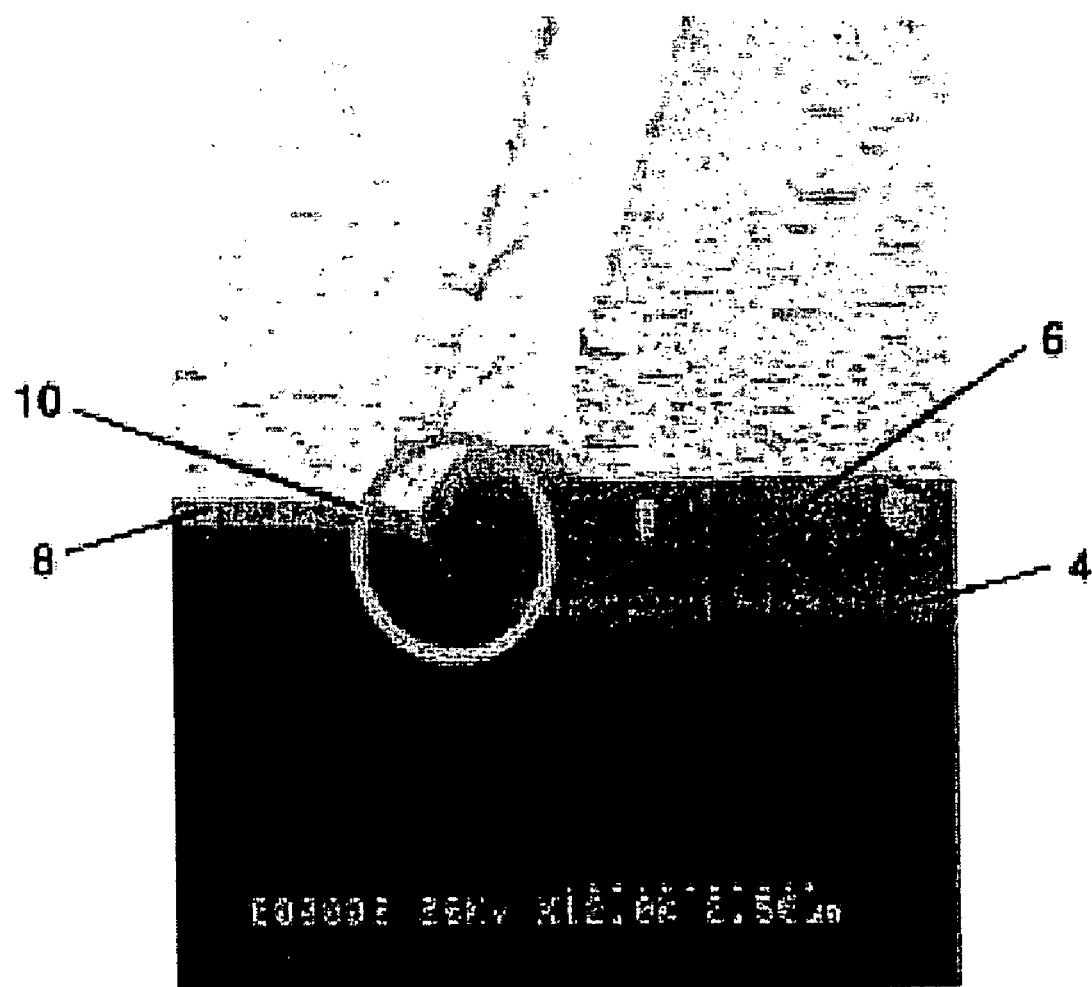
FIG. 1 is a SEM image illustrating a defect in an FED.

The FED can have poor step coverage at a step portion of a silicon oxide ($SiO_2$) film formed between a focus gate electrode and a gate electrode. This can result in electrical defects such as a crack 10 shown in FIG. 1 that cause insulating breakage at the step portion. Such defect could generate a leakage current between the two electrodes, thereby generating joule heat at the step portion. In FIG. 1, reference numerals 4, 6, and 8 respectively represent a gate electrode, a silicon oxide film, and a focus gate electrode.

The above problem associated with the silicon oxide film ($SiO_2$) can be solved to some degree by increasing thickness of the silicon oxide film. However, it is not easy to obtain a desirable thickness because a peeling-off phenomenon occurs when the thickness of the silicon oxide film is increased to more than 2 μm.

In order to solve this problem, several FEDs having a variety of structures have been developed. In FEDs, an FED having an imbedded focusing structure and an FED having a metal mesh structure are widely used.

In the former case of the imbedded focusing structure, a possibility of crack formation between a focus gate electrode and a gate electrode for extracting electrons is low, but an outgassing process for venting gas generated by a polyimide is required because the focus gate electrode is formed on a layer of polyimide.

On the other hand, in the latter case of a metal mesh structure, focusing an electron beam can be improved by disposing a metal mesh around the tip. However, processing and bonding the metal mesh is difficult as an electron beam may be shifted due to misalignment of the metal mesh.

Figure 2:
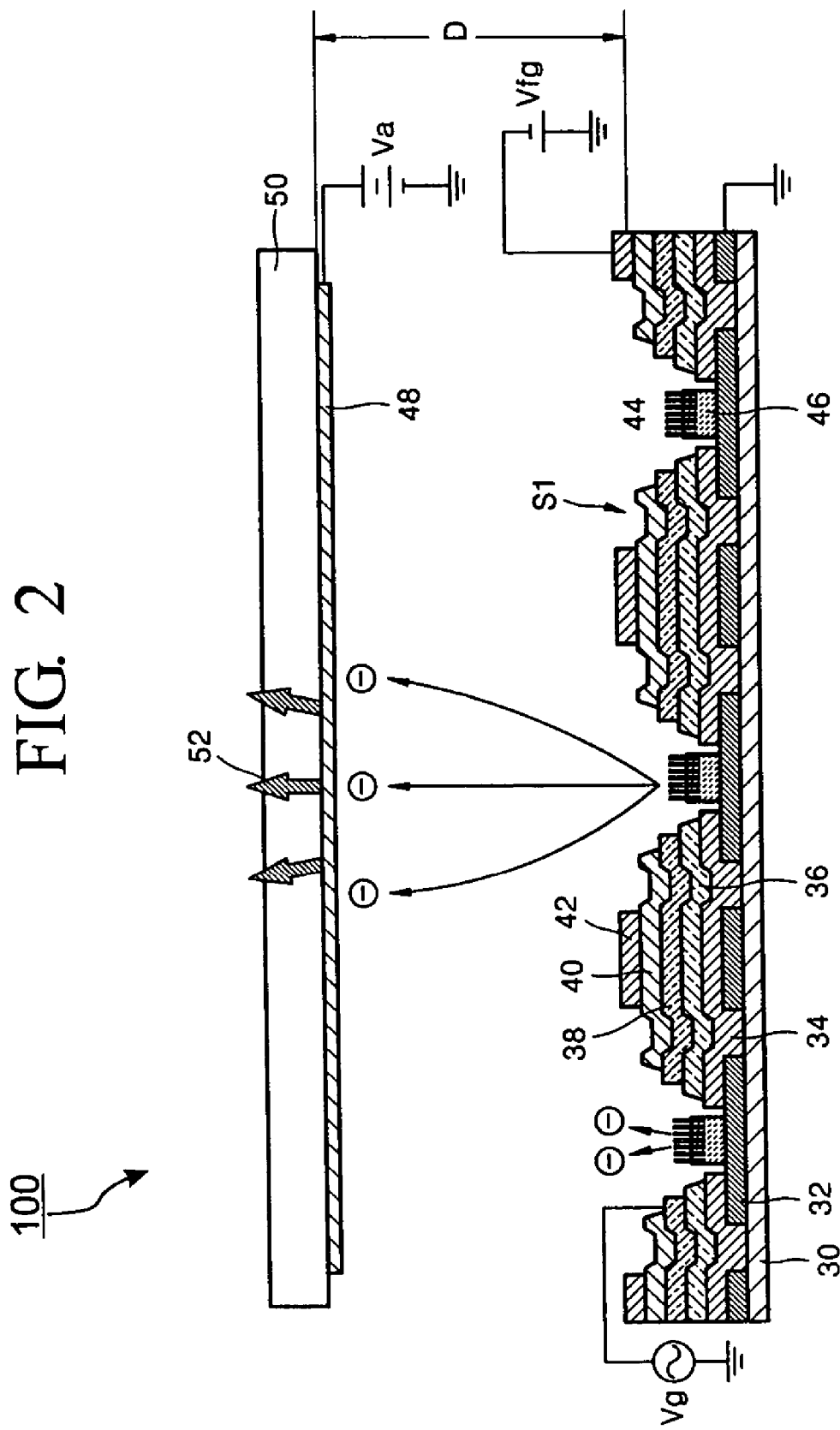
FIG. 2 is a cross-sectional view of an FED that includes a CNT emitter according to an exemplary embodiment of the present invention.

Turning now to FIG. 2, FIG. 2 is a cross-sectional view of an FED 100 according to an embodiment of the present invention. As seen in FIG. 2, FED 100 has a CNT emitter. Referring to FIG. 2, transparent electrodes 32 are formed on a glass substrate 30. The transparent electrodes 32 may be made of indium tin oxide (ITO) and may be used as the emitter electrodes. Gate stacks S1 that cover a portion of the transparent electrodes 32 are formed on the glass substrate 30. There are contact holes 44 that expose portions of the transparent electrodes 32 between the gate stacks S1. CNT emitters 46 that emit electrons are formed on a portion of the transparent electrode 32 exposed through the contact holes 44. Thus, CNT is emitters 46 are formed between gate stacks S1 and do not contact the gate stack S1. Each gate stack S1 includes a first mask layer 34 that covers a portion of the transparent electrodes 32, and is used as a UV photolithograph mask during the manufacturing process of FED 100. The mask layer 34 is spaced away from the CNT emitters 46. A gate insulating film 36, a gate electrode 38, a focus gate insulating film 40, and a focus gate electrode 42 are sequentially formed on the first mask layer 34 and have sequentially narrowing widths. Accordingly, a side surface of the gate stack S1 is sloped with steps.

In a manufacturing process for forming the CNT FED 100 depicted in FIG. 2, which will be describe later, a number of components that constitute the gate stack S1 are patterned by a back-exposing method using ultra violet rays through the transparent substrate 30. Therefore, the first mask layer 34 is preferably transparent to visible light, but opaque to ultra violet rays and can be made of an amorphous silicon layer. The gate insulating film 36 is preferably a first silicon oxide film. The gate electrode 38 is a first chrome electrode with a thickness of about 0.25 μm or a conductive electrode with a thickness other than 0.25 μm. The focus gate insulating film 40 that electrically insulates the gate electrode 38 from the focus gate electrode 42 is a second silicon oxide ($SiO_x$) film having a thickness of 2 μm or more, and preferably 3~15 μm. At this time, the sub-script x in the molecular formula of the second silicon oxide is preferably less than 2 (x<2). The focus gate insulating film 40 can also be an insulating film having equivalent or similar physical characteristics to the second silicon oxide film. The focus gate electrode 42 is formed symmetrically about the CNT emitter 46 and is a second chrome electrode having a predetermined thickness. The focus gate electrode 42 is in no way limited to chrome, and is no way limited to any particular thickness.

The gate electrode 38 is used for extracting an electron beam from the CNT emitter 46. Accordingly, a predetermined alternating gate voltage $V_g$, for example, +80 V may be applied to the gate electrode 38 between the gate electrode 38 and the grounded transparent emitter electrode 32.

The focus gate electrode 42 performs as a collector for collecting electrons emitted from the CNT emitter 46 so that the electrons can reach a fluorescent film 48 disposed above the CNT emitter 46. For this purpose, a focus gate voltage $V_{fg}$ that has the same polarity as the electron beam and has a lower absolute value than the alternating gate voltage $V_g$. For example, a focus gate voltage $V_{fg}$ of −10 V can be applied between the focus gate electrode 42 and the grounded transparent emitter electrode 32.

Referring to FIG. 2, a front panel 50 is disposed upward and above the focus gate electrode 42 of the gate stack S1. The front panel 50 is spaced away by a predetermined distance D upward from the focus gate electrode 42 of the gate stack S1. A variety of information (variable visual images) are displayed on the front panel 50. A fluorescent film 48 is attached to a bottom surface of the front panel 50 that faces the gate stack S1 and a direct current voltage $V_a$ is applied to the fluorescent film 48. A fluorescent substance that emits red R, green G, and blue B visible light when excited by the electron beam is evenly distributed on the fluorescent film 48. In FIG. 2, spacers separating the front panel 50 from the gate stack S1 is a black matrix layer and is not shown for convenience.

Figure 3:
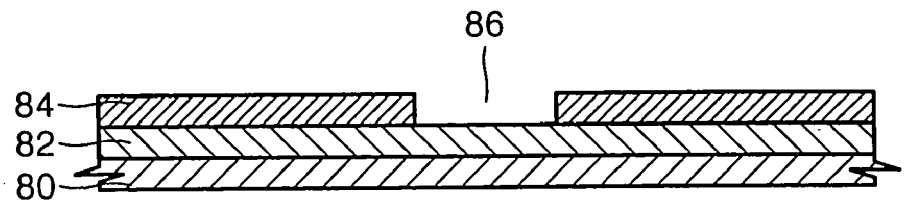
FIGS. 3 through 11 are cross-sectional views showing processes for stacking and etching an oxide film applied for forming a focus gate insulating film which is included in a gate stack of the FED illustrated in FIG. 2.

A method of manufacturing the CNT FED 100, particularly for forming the gate stack S1 according to an exemplary embodiment of the present invention will now be described referring to FIGS. 3 through 11. Referring to FIG. 3, a first electrode 82 and a second mask layer 84 are sequentially formed on a substrate 80. A through hole 86 that exposes the first electrode 82 is formed in the second mask layer 84. The second mask layer 84 is preferably formed of a material that it is transparent to visible light, but opaque to ultra violet light, such as an amorphous silicon layer, so that the second mask layer 84 can serve as a photo mask when UV light and UV sensitive photosensitive material are used.

Figure 4:
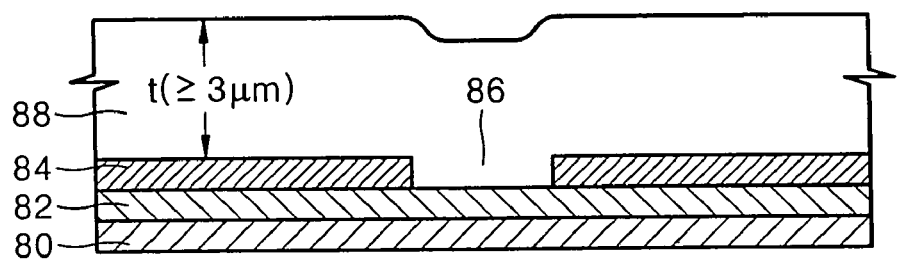

Referring to FIG. 4, an insulating film 88 that fills the through hole 86 is formed on the second mask layer 84 to have a predetermined thickness t. The insulating film 88 is preferably formed of a silicon film ($SiO_x$) (x<2) having a higher silicon content than in a silicon dioxide film ($SiO_2$). The insulating film 88 can be formed to a thickness of 2 μm or more, preferably 3~15 μm, and more preferably 6~15 μm. The insulating film 88 can be formed to a different thickness from the silicon oxide film ($SiO_x$) using a plasma enhanced chemical vapor deposition (PECVD) method using RF. However, the method of forming the insulating film 88 may differ according to the thickness to be formed. For example, when the desired thickness of the insulating film 88 is in the low end of the above range, the insulating film 88 can be formed by a sputtering method. On the other hand, when the desired thickness of the insulating film 88 is in the high end of the above range, the insulating film 88 can be formed by an electroplating method or a thermal evaporation method.

When forming the insulating film 88 using a PECVD method, the process conditions are as follows. The substrate should be maintained in a temperature range of 250~450° C., preferably 340° C., and the RF power is maintained in a range of 100~300 W, and preferably 160 W. Pressure in the chamber should be maintained in a range of 600~1,200 mTorr, and preferably 900 mTorr. The flow rate of silane ($SiH_4$) source gas is preferably controlled so that the deposition rate is at least 400 nm/min. For example, the flow rate of silane ($SiH_4$) is maintained at a much higher level than a flow rate of (15 sccm) used to form a silicon dioxide film ($SiO_2$) of FIG. 1. Preferably, the silane flow rate used to form insulating film 88 is about 50~700 sccm, and preferably 300 sccm. Also, the flow rate of nitric acid ($N_2O$) in the source gases is maintained at about 700~4,500 sccm, and preferably 1,000~3,000 sccm during PECVD growth of insulating film 88.

Figure 31:
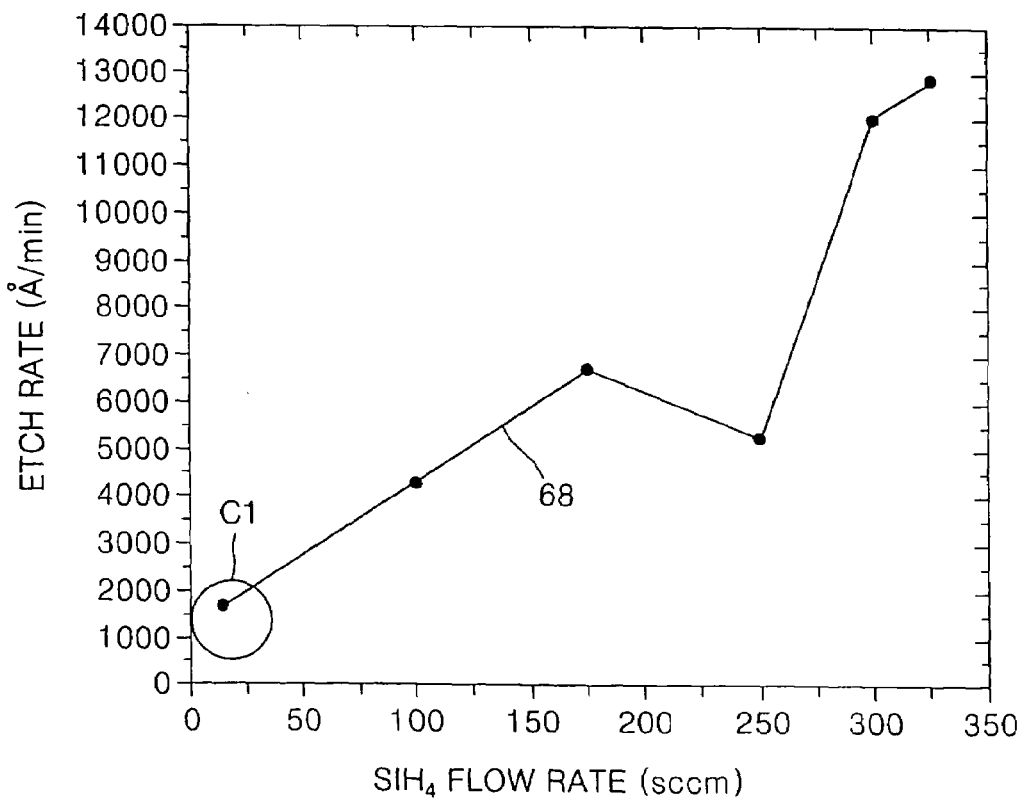
FIG. 31 is a graph illustrating an etching rate of the focus gate insulating film of the gate stack of the FED depicted in FIG. 2 with respect to flow rate of silane ($SiH_4$)

The same flow rate of silane ($SiH_4$) can be used for the etching process for silicon oxide film ($SiO_x$) using the PECVD method. As shown in graph 68 in FIG. 31, the etching rate of the silicon oxide film ($SiO_x$) is much greater than in case C1 with the same flow rate range of silane as suggested above for growth of the insulating film 88. The flow rate of silane in the etching of the silicon oxide is preferably maintained so that the etching rate of the silicon oxide is 100 nm/min or more.

Figure 28:
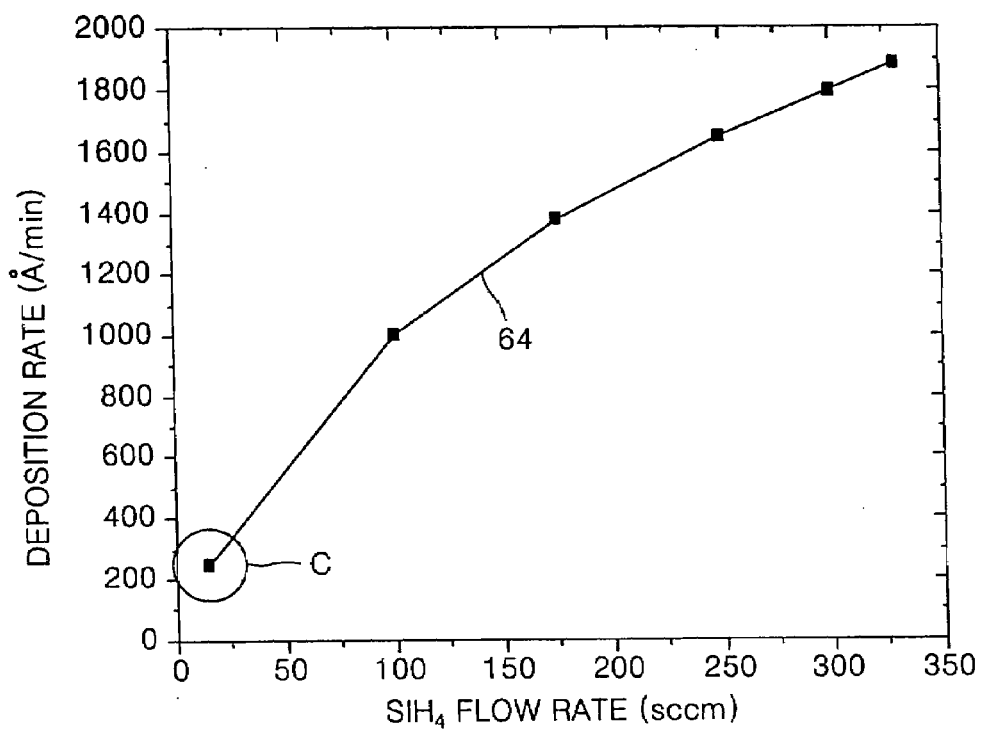
FIG. 28 is a graph illustrating a deposition rate of a focus gate insulating film in a gate stack of an FED depicted in FIG. 2 with respect to flow rate of silane ($SiH_4$).
Figure 29:
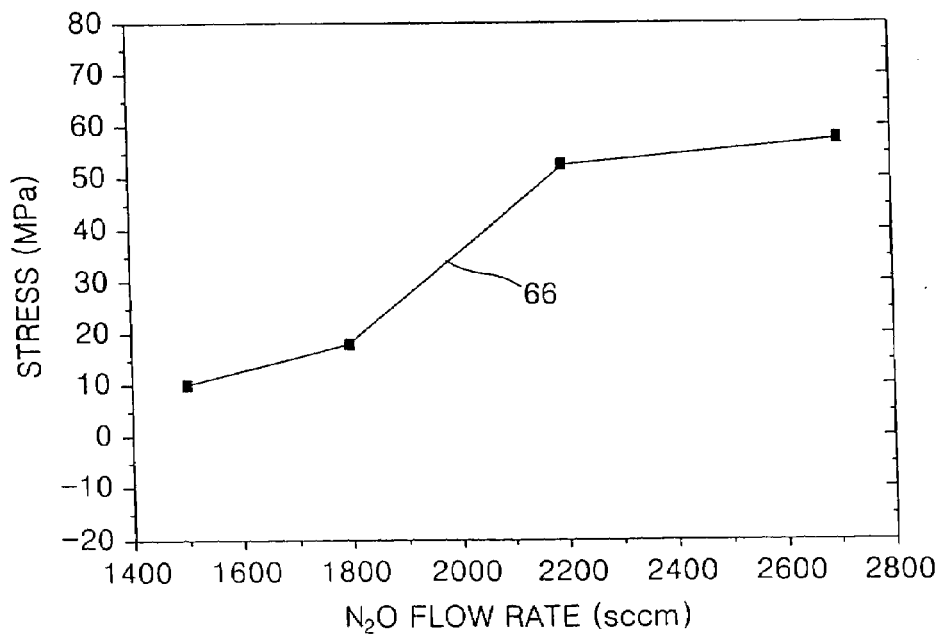
FIG. 29 is a graph illustrating a stress of the focus gate insulating film of the gate stack of the FED depicted in FIG. 2 with respect to flow rate of nitric acid ($N_2O$).
Figure 30:
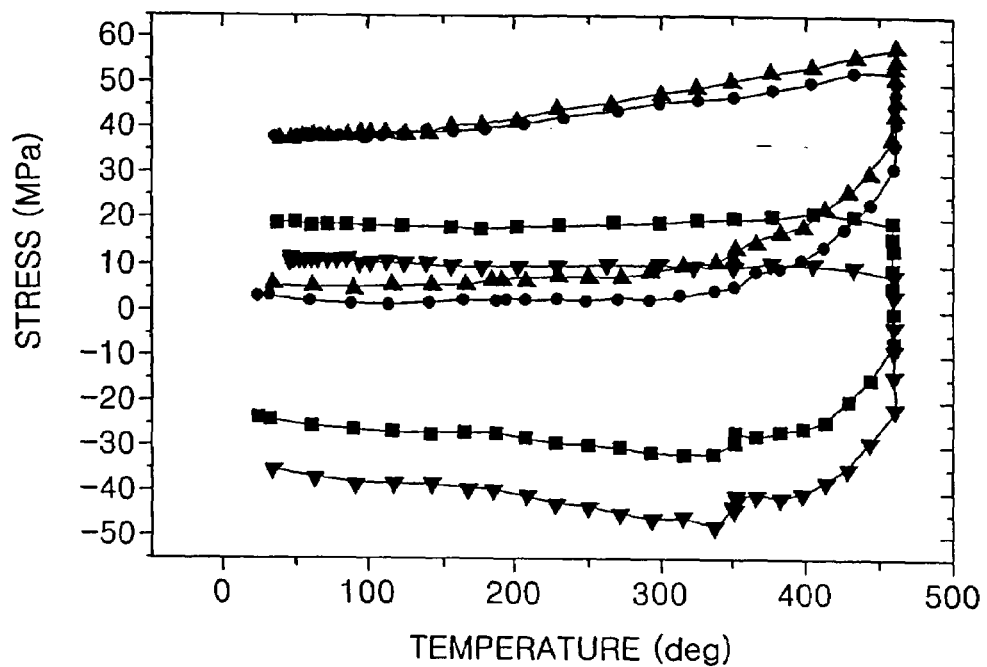
FIG. 30 is a graph illustrating stress of the focus gate insulating film of the gate stack of the FED depicted in FIG. 2 with respect to a temperature of a substrate and flow rate of nitric acid.

When forming the silicon oxide film ($SiO_x$) under the process conditions as described above, the silicon oxide film can be formed to a thickness as mentioned above. Therefore, a step coverage improvement can be obtained. As shown in graph 64 in FIG. 28, the deposition rate (Å/min) is much greater than deposition rate C when the silane flow is increased above the flow rate C. Also, as shown graph 66 in FIG. 29, when controlling the flow rate of nitric acid, stress of the silicon oxide film ($SiO_x$) is lowered below 100 Mpa. Furthermore, as shown in FIG. 30, when the flow rate of the nitric acid remains constant and the temperature of the substrate is kept within the above mentioned range, stress of the silicon oxide film ($SiO_x$) is less than 100 MPa. The low stress of the silicon oxide film ($SiO_x$) means that the density of the silicon oxide film ($SiO_x$) is lower. When the density of the silicon oxide film is lower, this means that the silicon oxide film ($SiO_x$) is similar to a porous material.

In FIG. 30, the positive (+) stress values represent compressive stresses, while, the negative value (−) stress values represent a tensile stresses. Reference symbols "▲", "●", "■", and "▼" represent cases when the flow rate of nitric acid is 2,700 sccm, 2,200 sccm, 1,800 sccm, and 1,500 sccm, respectively.

When forming the silicon oxide film (SiO$_x$) under the given process conditions, a silicon oxide film (SiO$_x$) that is higher in silicon concentration and much lower stress than a silicon oxide film of FIG. 1 can be formed. Therefore, the possibility that defects such as cracks being formed in the insulating film 88 which is formed of the silicon oxide film (SiO$_x$), and particularly cracks in the step region is reduced compared to the silicon oxide film of FIG. 1. Accordingly, when the insulating film 88 is formed according to the above process conditions, a possibility of leakage current between an electrode which will be formed on the insulating film 88 and the first electrode 82 located beneath the insulating film 88 is very low.

A different insulating film (correspondence to the gate insulating film 36 of the present FED 100) that covers the second mask layer 84 and a different electrode (correspondence to the gate electrode 38 of the present FED 100) can be sequentially formed between the second mask layer 84 and the insulating film 88. In this case, when the insulating film 88 is formed under the above process conditions, a leakage current between an electrode which will be formed on the insulating film and other electrodes can be reduced due to the characteristics of the insulating film 88 described above.

Figure 5:
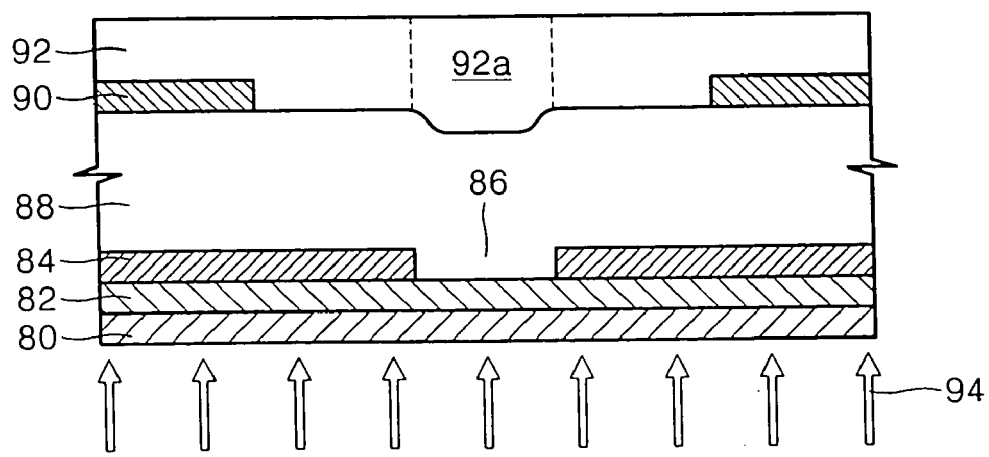

Referring to FIG. 5, a second electrode 90 is formed on the insulating film 88. The second electrode 90 can be a chrome electrode but can also be of some other material. The second electrode 90 may correspond to the focus gate electrode 42 in FIG. 2 included in the gate stack S1 of the present FED 100. A first photosensitive film 92 is formed on the second electrode 90 and the insulating film 88. The first photosensitive film 92 is preferably formed of a UV sensitive positive photoresist film. After forming the first photosensitive film 92, ultra violet rays 94 are radiated onto a lower surface of the substrate 80. By doing so, second mask layer 84 serves as a mask for photosensitive film 92. At this time, regions besides those not exposed by the through hole 86 in the second mask layer 84 are not exposed to the ultra violet rays 94 because the second mask layer 84 is opaque to UV rays. The ultra violet rays 94 penetrate through the through hole 86 by which an exposure region 92a in the first photosensitive film 92 is exposed.

Figure 6:
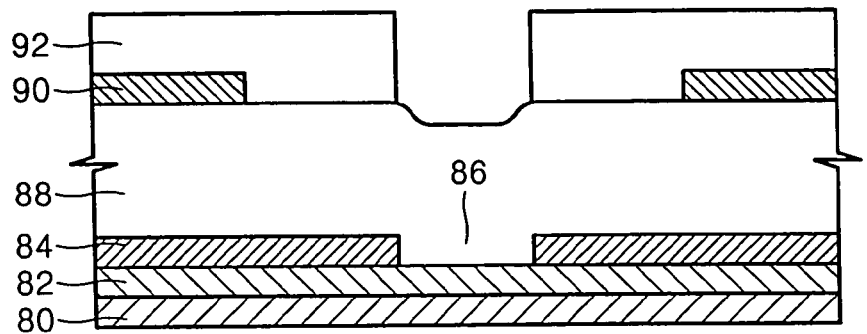

Referring to FIG. 6, the exposed region 92a of the first photosensitive film 92 is removed by developing and then a baking process is performed. FIG. 6 shows a resultant product for which the developing and baking processes are sequentially performed. A portion of the insulating film 88 is exposed through the hole in the first photosensitive film 92 formed when the exposure region 92a is removed. This exposed portion om insulating film 88 corresponds to through hole 86 in second mask layer 84.

Figure 7:
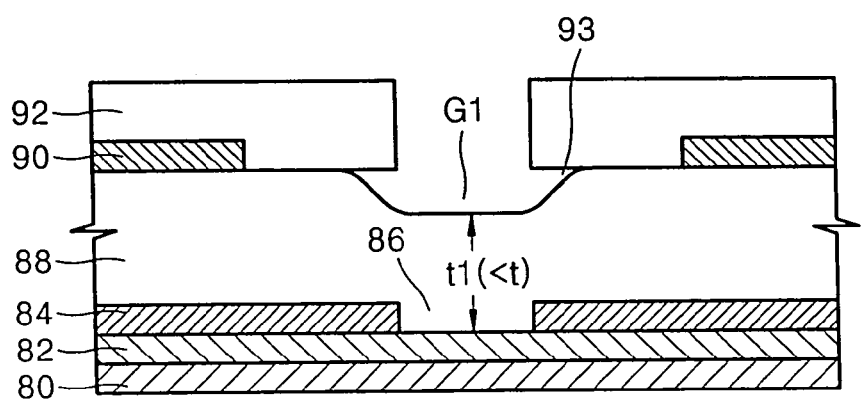

Referring to FIG. 7, the insulating film 88 is first etched using the first photosensitive film 92 as an etch mask. The first etching is a wet etching using a predetermined etchant and performed for a determined period. This wet etch produces a first groove G1 with a predetermined depth in the insulating film 88 underneath the first photosensitive film 92 at a location in insulating film that essentially corresponds to through hole 86 in second mask layer 84. The thickness of the insulating film 88 is reduced from t to t1 as a result of the etch. The thickness t1 of the insulating film 88 where the first groove region G1 is formed is thinner than the thickness t in other regions of the insulating film 88 which are not etched. The first groove G1 extends under the first photosensitive film 92 due to an isotropic characteristic of the wet etching. Therefore, a first undercut 93 is formed under the first photosensitive film 92 by the wet etch.

Figure 8:
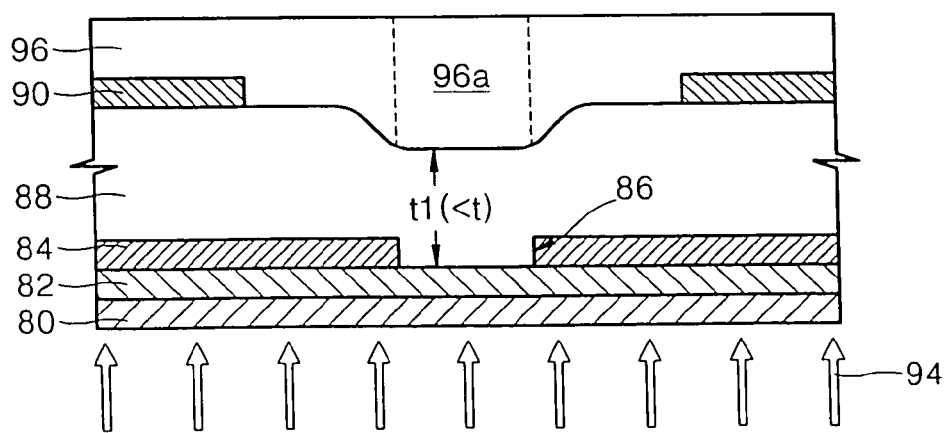

Referring to FIG. 8, after removing the first photosensitive film 92, a second photosensitive film 96 is formed on the insulating film 88 and on the second electrode 90. The second photosensitive film 96 is formed of the same material as the first photosensitive film 92 (i.e., positive UV sensitive material). A second back exposing is performed after forming the second photosensitive film 96. In the second back exposing process, a region 96a corresponding to the through hole 86 is exposed in the second photosensitive film 96. Afterward, the second exposed region 96a is removed by performing a developing process. After removing the second exposed region 96a, a bake process is performed.

Figure 9:
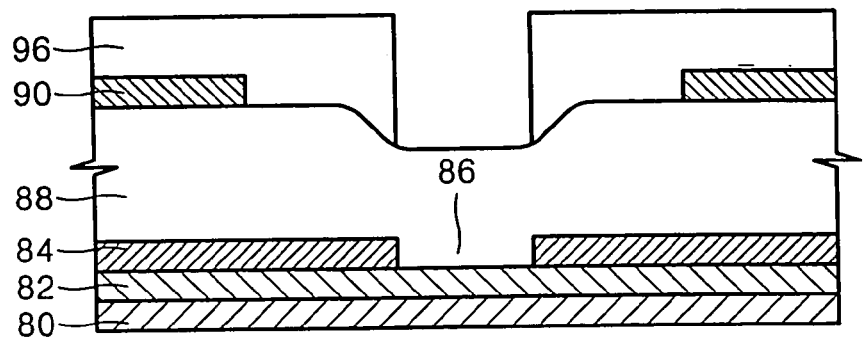

FIG. 9 shows a resultant product after baking the second photosensitive film 96. A portion of the first groove G1 of insulating film 88 is exposed by the second photosensitive film 96.

Figure 10:
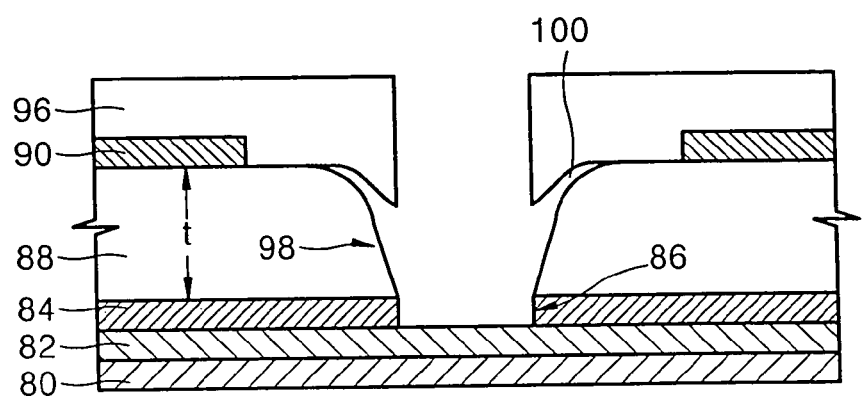

Referring to FIG. 10, the insulating film 88 in which the first groove G1 is formed is etched again until insulating film 88 is completely perforated so that first electrode 82 is exposed by using the second photosensitive film 96 as an etch mask. The second etching can be a wet etch using a predetermined etchant. That is, a through hole 98 that exposes a portion of the first electrode 82 is formed in the insulating film 88. The through hole 98 extends under the second photosensitive film 96 due to the isotropic characteristics of the wet etching. As a result, a second undercut 100 is formed under the second photosensitive film 96.

Figure 11:
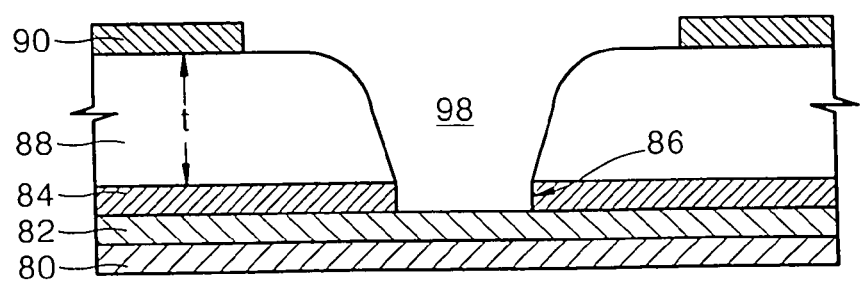

Referring to FIG. 11, the second photosensitive film 96 is removed by ashing and stripping. Then, processes for cleaning and drying are performed. Thus, a smooth through hole 98 that exposes the first electrode 82 is formed in the insulating film 88.

Figure 12:
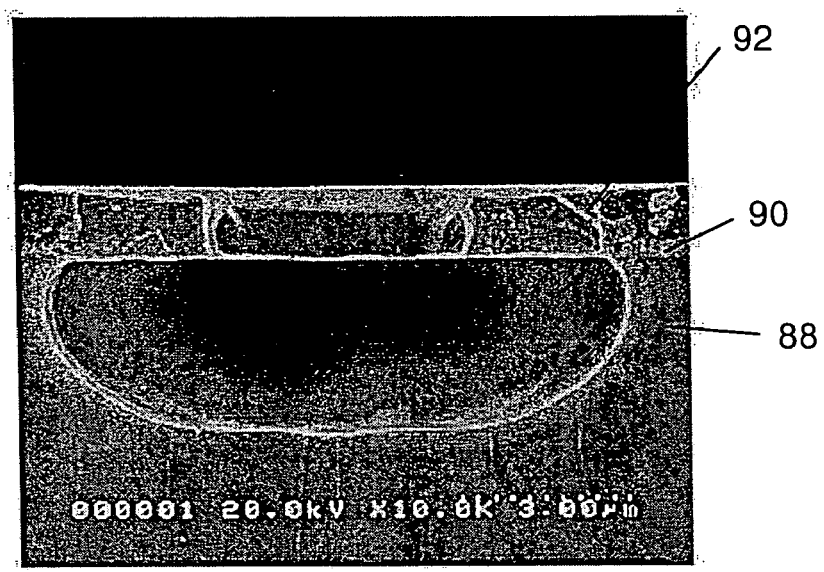
FIG. 12 is a SEM image of a resultant product on which a photosensitive film remains right after first wet etching for an oxide film during the oxide film stacking and etching processes depicted in FIGS. 3 through 11.

FIG. 12 is a SEM image of a resultant product right after the first etching the insulating film 88 as in FIG. 7. In the SEM image of FIG. 12, the first photosensitive film 92, the second electrode 90, and the insulating film 88 can be seen.

Figure 13:
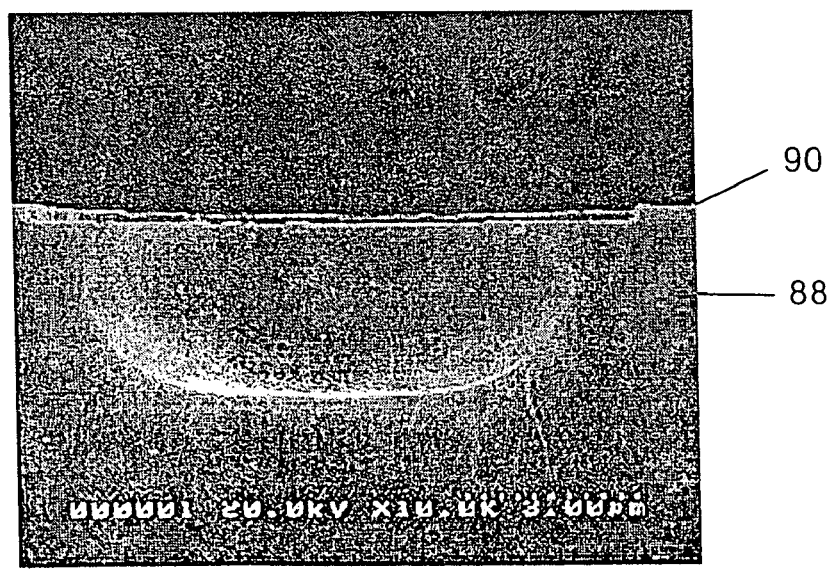
FIG. 13 is a SEM image for a resultant product from which a photosensitive film depicted in FIG. 12 is removed.

FIG. 13 is a SEM image of a resultant product after removing the first photosensitive film 92 in FIG. 12. A slightly recessed portion on the insulating film 88 is a region in which the first photosensitive film 92 was located.

It is possible that more than two wet etch cycles are needed to completely perforate insulating film 88 and expose first electrode 82 without generating an excessive undercut. The described insulating film 88 can be wet etched more than twice, and the through hole 98 formed through the insulating film 88 can be formed by wet etching up to four times. The wet etching processes for a third and a fourth etch follow essentially the same processes as for etching the insulating film 88 both the first and second times. Thus, the application of a photosensitive layer, the exposing, developing, etching of the insulating film and removal of the photosensitive layer are essentially the same for each wet etch cycle.

Figure 14:
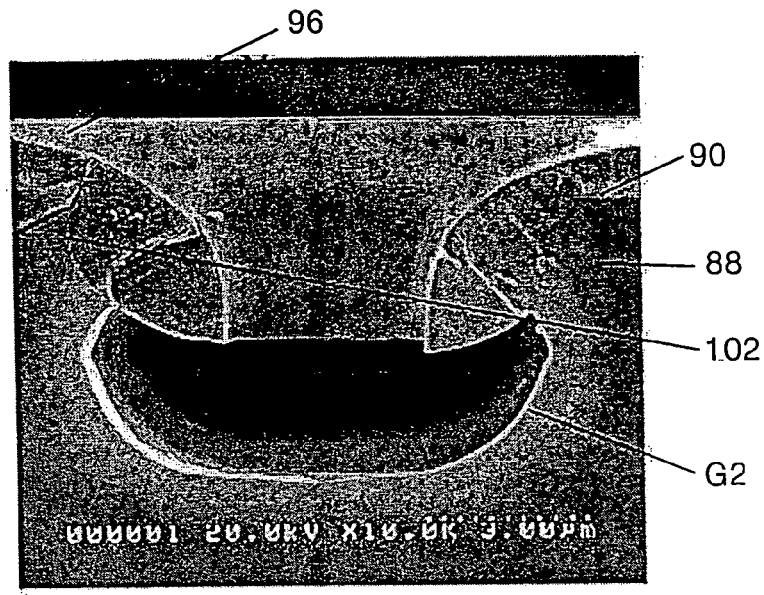
FIG. 14 is a SEM image of a resultant product on which a photosensitive film remains right after second wet etching for an oxide film during the oxide film stacking and etching process depicted in FIGS. 3 through 11.

FIG. 14 is a SEM image of a resultant product right after a second of a possible four wet etchings. Reference numeral 102 represents an interface between the second photosensitive film 96 and the insulating film 88.

Figure 15:
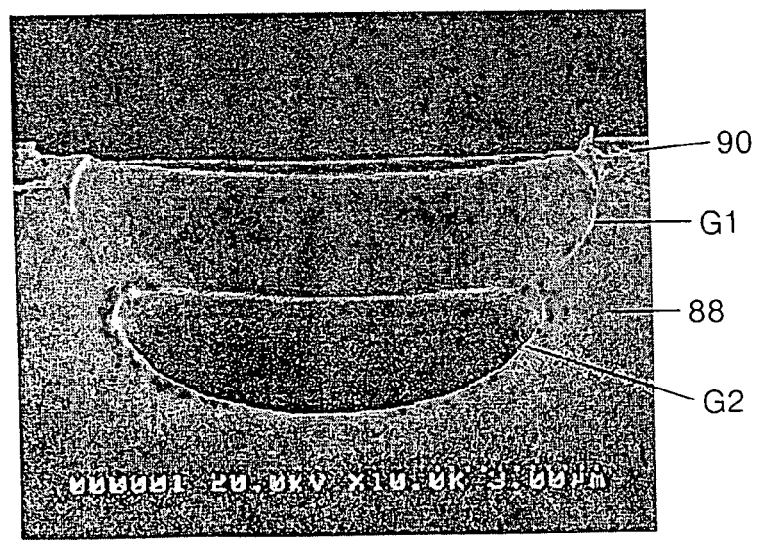
FIG. 15 is a SEM image for a resultant product from which a photosensitive film depicted in FIG. 14 is removed.

FIG. 15 is a SEM image of a resultant product after removing the second photosensitive film 96 in FIG. 14, and after cleaning and drying of the resultant structure. Referring to FIG. 15, a second groove G2 is formed in a region below the first groove G1. A slightly concaved portion on the first groove G1 is a region at which the second photosensitive film 96 was located.

Figure 16:
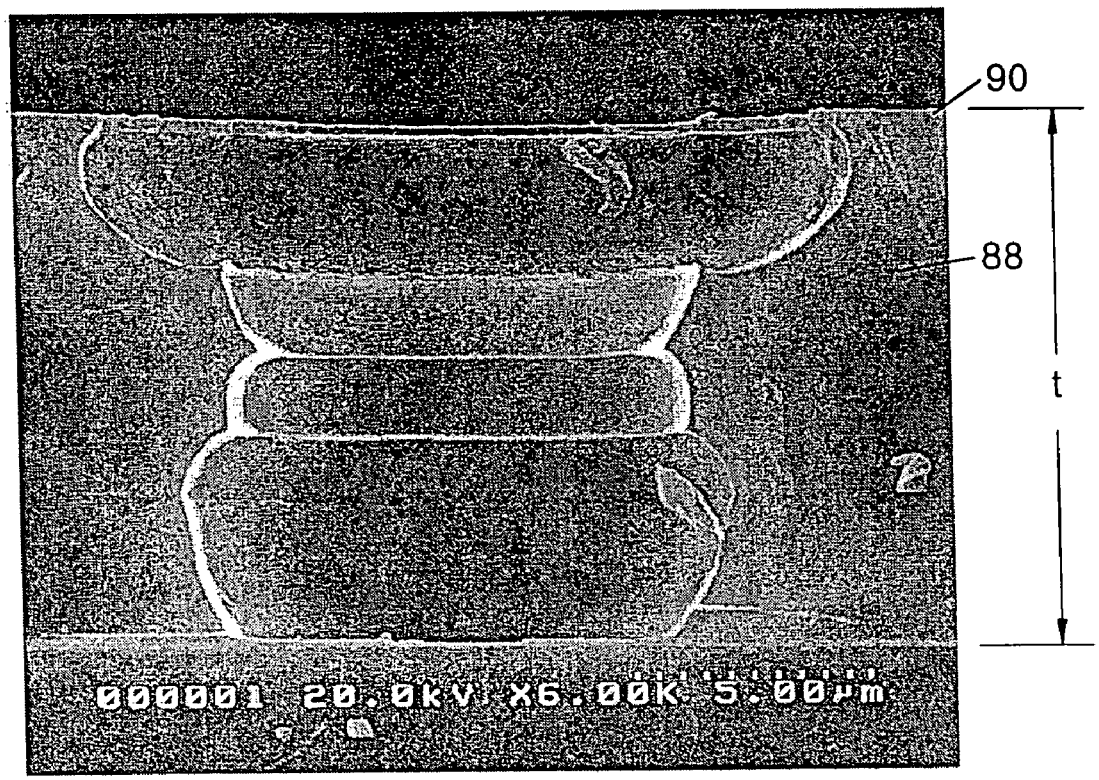
FIG. 16 is a SEM image of a resultant product from which a photosensitive film is removed after completing four times of wet etching for an oxide film during the oxide film stacking and etching process depicted in FIGS. 3 through 11.

FIG. 16 is a SEM image of a resultant product after a fourth wet etching in the insulating film 88. Referring to FIG. 16, a contact hole is vertically formed in the insulating film 88 and completely perforates the insulating film 88. In general, a vertical profile of the contact hole is well formed. Reference character t represents a thickness of the insulating film 88.

It is also to be appreciated that the present invention is in no way limited to back exposing. The FED of the present invention can be made instead by front exposing. The processes described in conjunction with FIGS. 3 through 11 can instead be accomplished by exposing the photosensitive films from above instead of from underneath. In such a scenario, a separate mask is needed to pattern the photosensitive layer as second mask layer 84 not longer is used to pattern the photosensitive layer when exposed from above.

Figure 17:
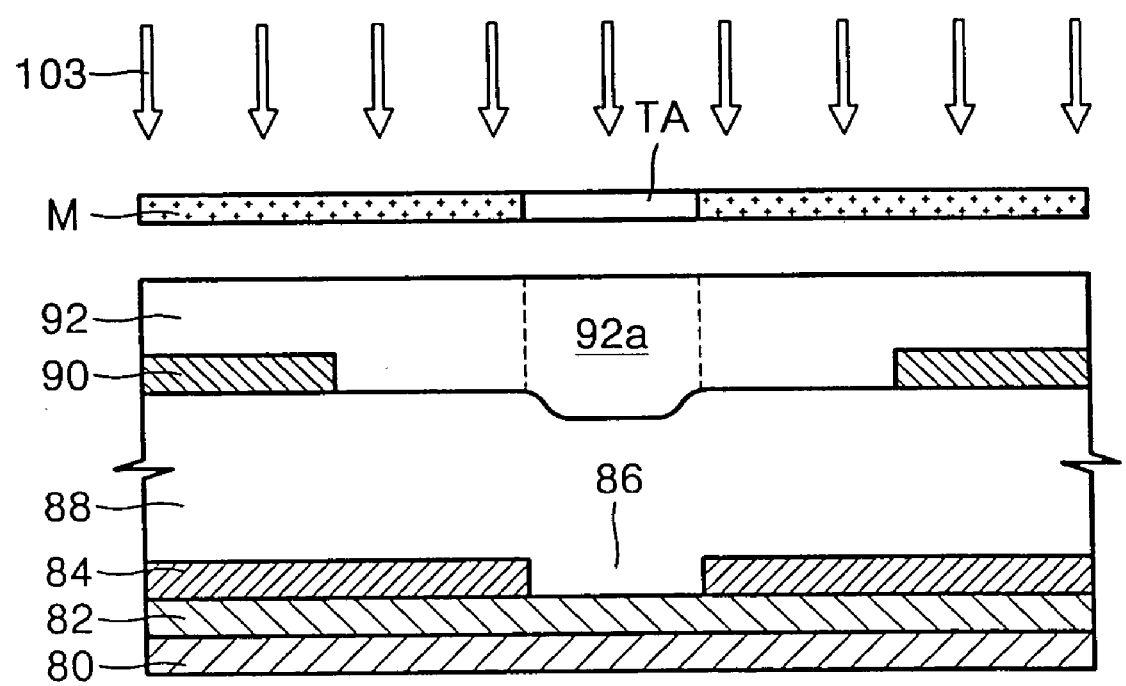
FIG. 17 is a cross-sectional view illustrating a process of exposing a photosensitive film using an exposing method from above using a mask which is different with an exposing method depicted in FIGS. 3 through 11 where the structure is exposed from below.

Turning to FIG. 17, FIG. 17 shows exposure from above using a mask M with opening TA used to transmit UV light 103 through mask M to exposure region 92a in photosensitive film 92. Referring to FIG. 17, a mask M is disposed a predetermined distance above the first photosensitive film 92, wherein the mask M has a transmission window TA in a region corresponding to the through (or contact) hole 86 and the remaining regions of the mask M are UV light shielding regions. Afterward, light 103 is irradiated from above the mask M toward the mask M. A portion of the light 103 irradiated toward the mask M is incident on the first photosensitive film 92 through the transmission window TA in mask M. Accordingly, a predetermined region 92a of the first photosensitive film 92 is exposed. Then, the mask M is removed. The developing, cleaning, and baking processes for the first photosensitive film 92 is then conducted. Then, the wet etching using the first photosensitive film 92 as the etch mask is the same as previously described. The front exposing method according to the present invention can be applied to the exposing processes for patterning the insulating film 88 to produce an etch mask of photosensitive material for each of the four wet etches.

Figure 18:
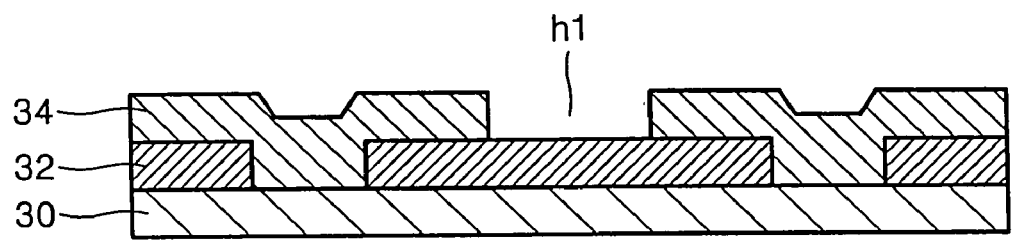
FIGS. 18 through 27 are cross-sectional views illustrating steps for forming a gate stack structure and a carbon nanotube emitter in the method of manufacturing an FED depicted in FIG. 2.

Next, a method of manufacturing a CNT FED 100 illustrated in FIG. 2 will now be described using the methods portrayed in FIGS. 3 through 11 and 17. Referring to FIG. 18, a transparent electrode 32 is formed on a glass substrate 30. The transparent electrode 32 may preferably be made out of ITO, but in no way is the present invention limited thereto. A first mask layer 34 used in back exposing is formed and patterned on the transparent electrode 32 and on the glass substrate 30. The first mask layer 34 is preferably formed of a material that is transparent to visible light but opaque to ultra violet rays, such as amorphous silicon. This will allow first mask layer 34 to serve as a patterning mask when UV light and UV photosensitive material is later used. A first through hole h1 that perforates first mask layer 34 and exposes a portion of the transparent electrode 32 on which a CNT emitter will later be formed is formed in the first mask layer 34.

Figure 19:
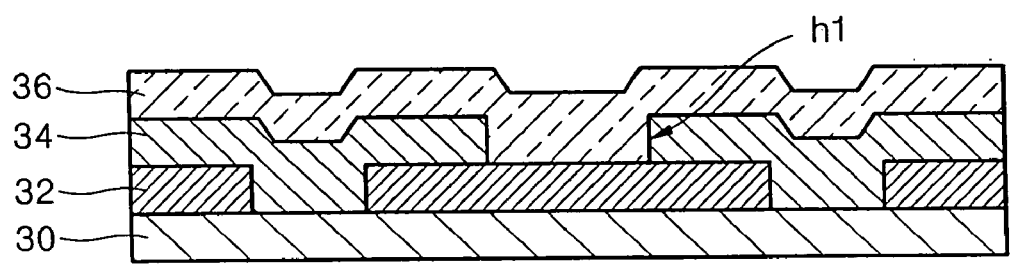

Referring to FIG. 19, a gate insulating film 36 that fills the first through hole h1 is formed on the first mask layer 34. The gate insulating film 36 is formed of a silicon dioxide film ($SiO_2$) to a thickness of 1~5 μm. The gate insulating film 36 can instead be formed of a silicon rich silicon oxide film ($SiO_x$, X<2) instead of a general silicon dioxide film. When x<2, the gate insulating film 36 can be formed by the method of forming the insulating film 88 depicted in FIGS. 3 through 11. It is desirable to use the back exposing as an exposing process, but the front exposing as depicted in FIG. 17 can also be used.

Figure 20:
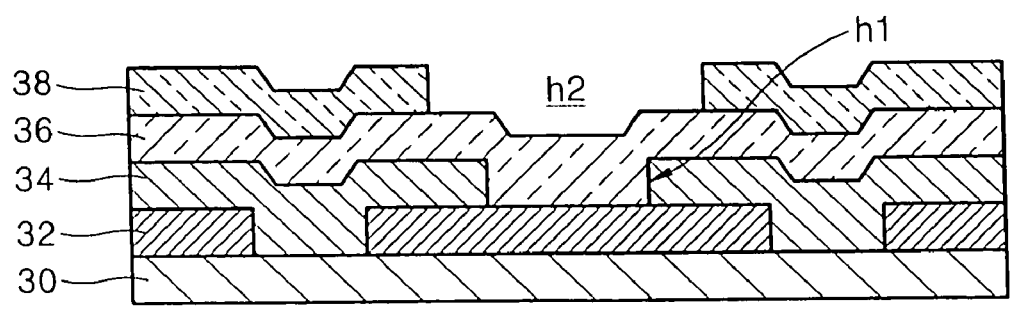

Referring to FIG. 20, a gate electrode 38 is formed on the gate insulating film 36. The gate electrode 38 is preferably formed of a chrome electrode with a thickness of about 0.25 μm. A second through hole h2 is then formed in the gate electrode 38 by patterning the gate electrode 38. At least a portion of the gate insulating film 36 that fills the first through hole h1 is exposed through the second through hole h2. Thus, the through holes h1 and h2 overlap to some degree. A diameter of the first through hole h1 is smaller than a diameter of the second through hole h2.

Figure 21:
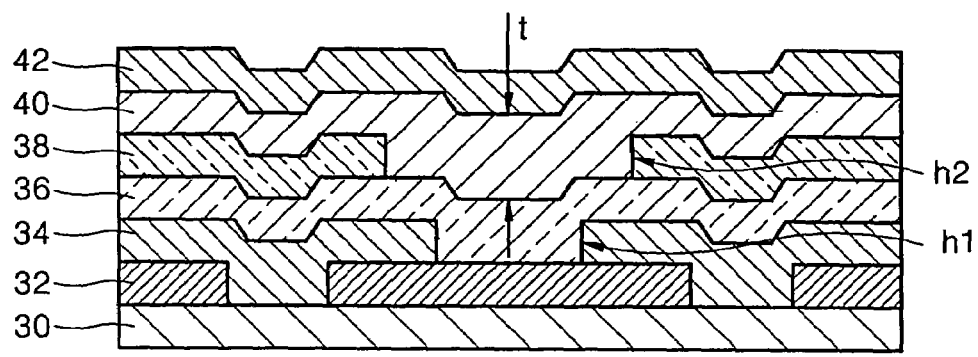

Referring to FIG. 21, a focus gate insulating film 40 that fills the second through hole h2 is formed on the gate electrode 38. The focus gate insulating film 40 can be formed using the same method as that used to form the insulating film 88 depicted in FIG. 3 through 11. It is desirable to use the back exposing as an exposing process, but the front exposing as depicted in FIG. 17 can also be used.

Figure 32:
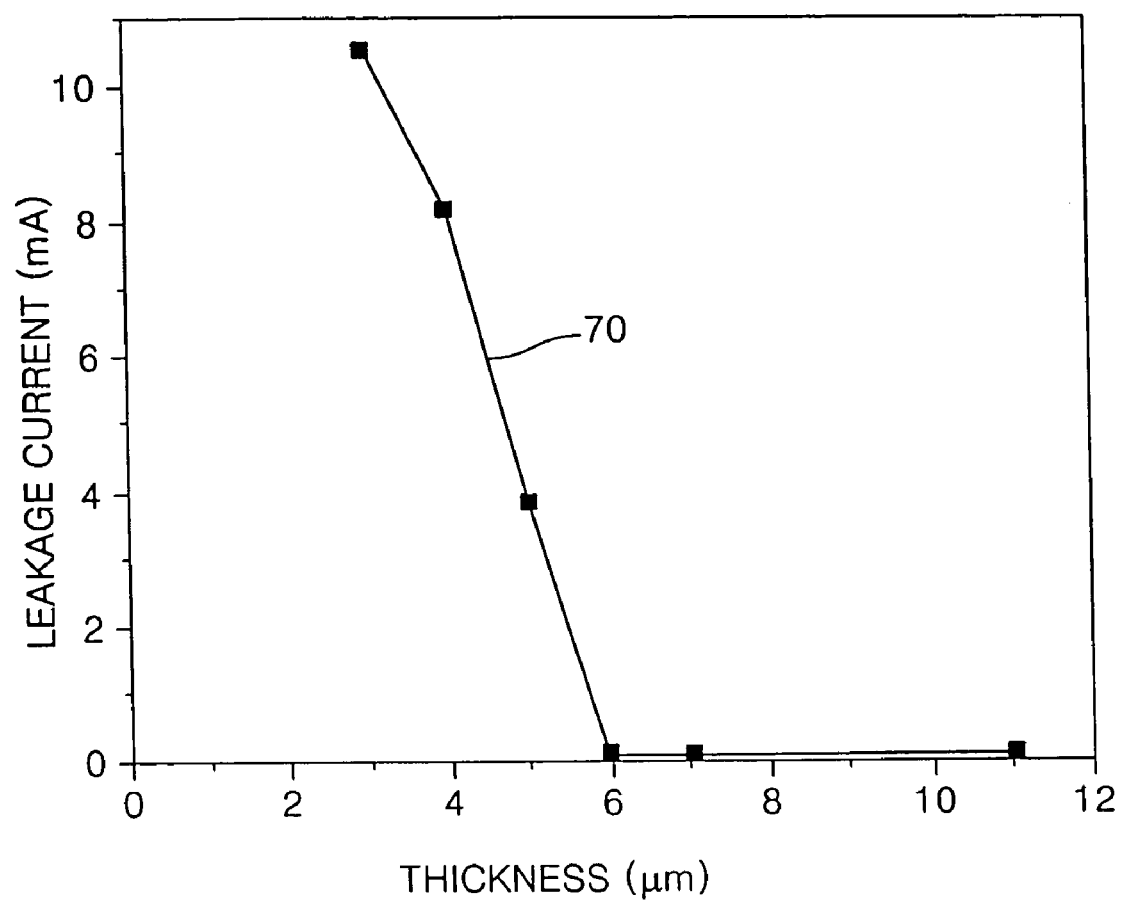
FIG. 32 is a graph illustrates leakage current with respect to a thickness of the focus gate insulating film of the gate stack of the FED depicted in FIG. 2.

Referring to graph 70 in FIG. 32, leakage current versus thickness is plotted. As can be seen from graph 70 of FIG. 32, it is seen that the leakage current is drastically reduced as the thickness of the focus gate insulating film 40 approaches to 6 μm, and beyond 6 μm, the leakage current is almost zero. Therefore, the thickness of the focus gate insulating film 40 should be at least 2 μm, preferably 3~15 μm, and more preferably 6~15 μm.

Figure 22:
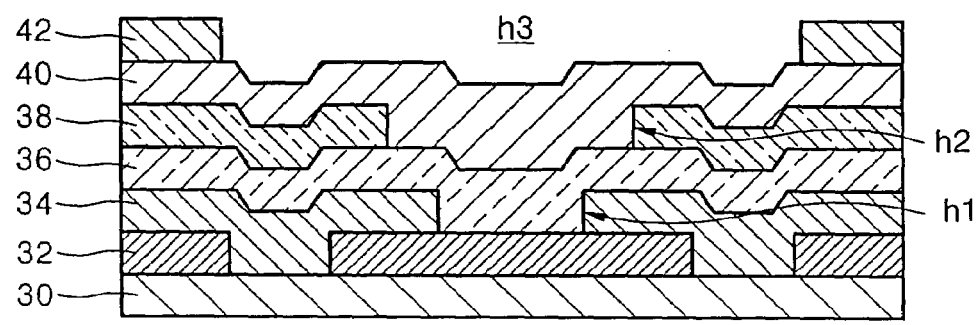

Again, referring to FIG. 21, a focus gate electrode 42 is formed on the focus gate insulating film 40. The focus gate electrode 42 is a second chrome electrode and is formed and patterned over the focus gate insulating film 40. As shown in FIG. 22, a third through hole h3 is formed in the focus gate electrode 42. An exposed portion of the focus gate insulating film 40 fills the second through hole h2 and a portion of the gate electrode 38 around the second through hole h2. The diameter of the third hole h3 is larger than that of the second through hole h2.

The focus gate electrode 42 and the gate electrode 38 can be formed in various types according to a design layout. For example, a plurality of second holes h2 can be formed within a single third hole h3 formed in the focus gate electrode 42, or only one second through hole h2 can be formed within one third through hole h3.

Figure 23:
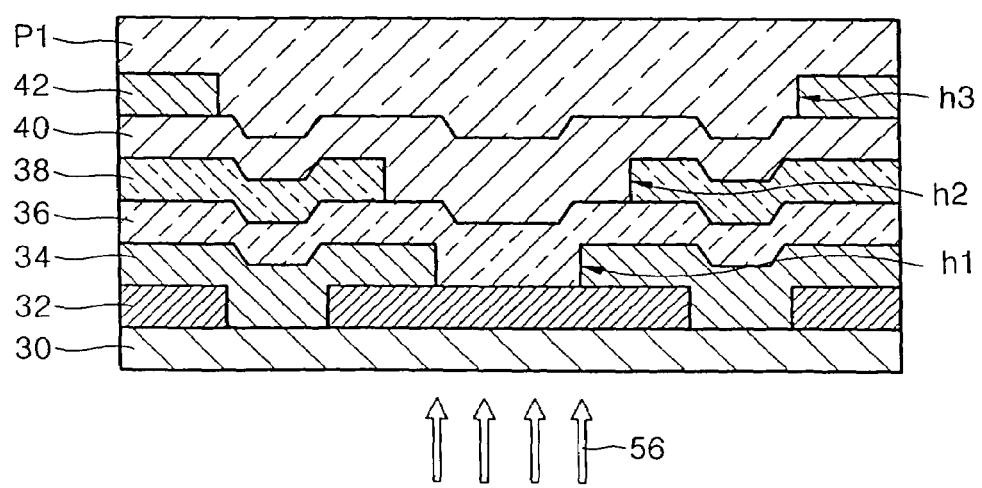

Referring to FIG. 23, a third photosensitive film P1 that fills the third through hole h3 is coated on the focus gate electrode 42. Then, a back exposing process is performed. That is, ultra violet rays 56 are irradiated onto the bottom of the glass substrate 30. The ultra violet rays 56 are incident to the third photosensitive film P1 through the transparent electrode 32, the first through hole hi, the gate insulating film 36, and the focus gate insulating film 40. The ultra violet light 56 incident on the regions outside the first through hole h1 is blocked by the first mask layer 34. Accordingly, only the region above the first through hole h1 of the third photosensitive film P1 is exposed to the ultra violet light 56. The exposed region of the third photosensitive film P1 is removed by a developing process, thereby exposing a portion of the focus gate insulating film 40 located directly above first through hole h1 in first mask layer 34. The exposed portion of the focus gate insulating film 40 is etched by wet etching using the third photosensitive film P1 as an etch mask. The wet etching is performed until focus gate insulating film 40 is completely perforated exposing gate insulating film 36. It is desirable to perform the wet etching according to the etching process depicted in FIGS. 6 through 11. It can take up to four wet etches to perforate through focus gate insulating film 40.

Figure 24:
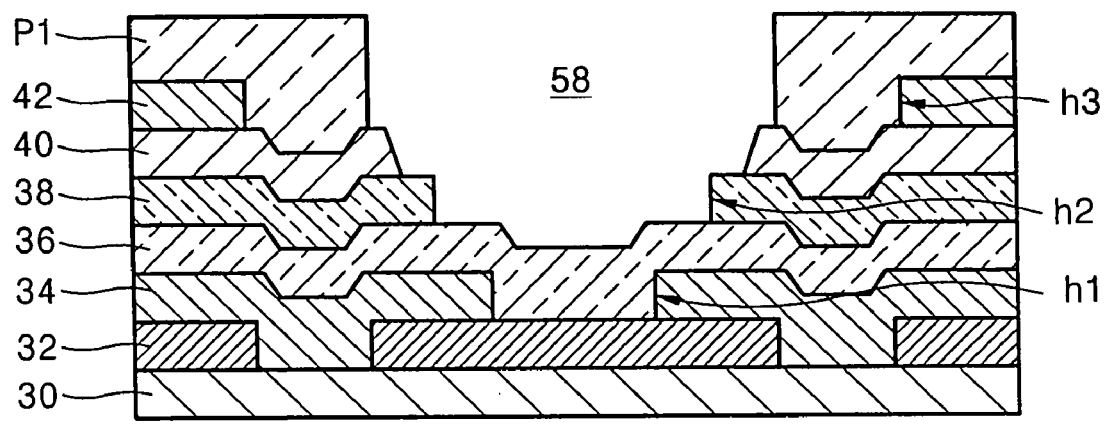

FIG. 24 shows a resultant product after removing the exposed portion defined by the third photosensitive film P1 and focus gate insulating film 40 is completely perforated by the wet etching. Referring to FIG. 24, a groove 58 is formed that completely perforates focus gate insulating film 40 leaving a portion of gate insulating film 36 exposed. The exposed portion of gate insulating film 36 corresponds to through hole h1 formed in mask layer 34. After forming the groove 58, the remaining third photosensitive film P1 is removed.

Figure 25:
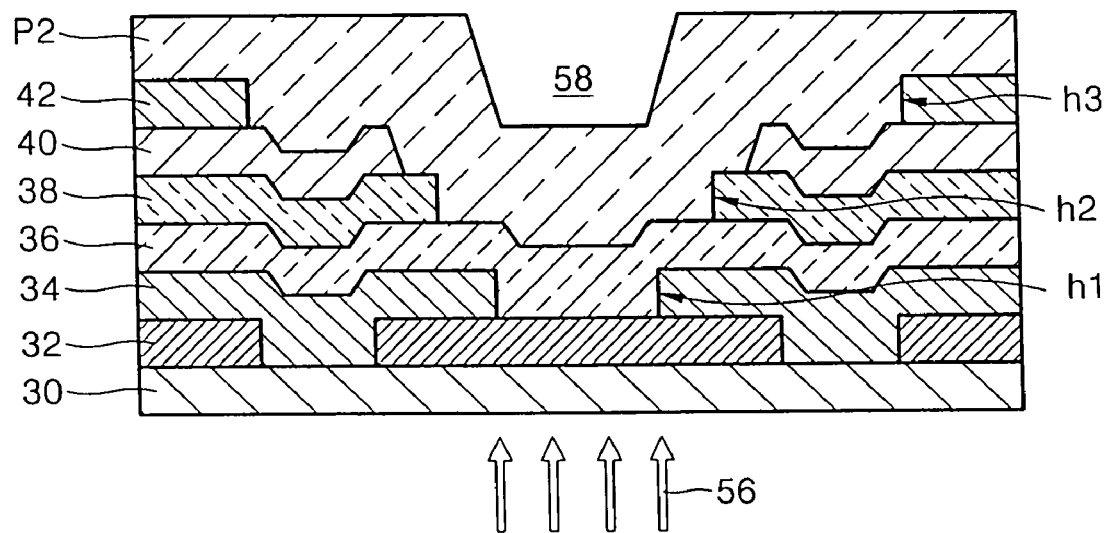
Figure 26:
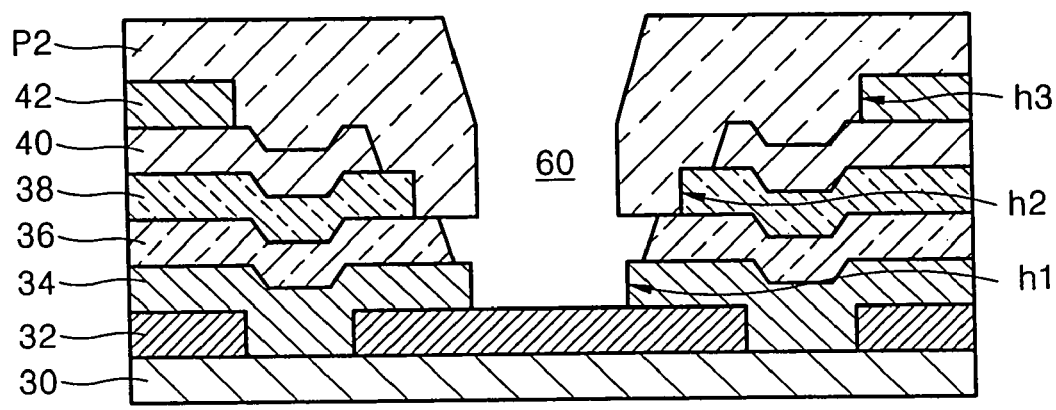

FIGS. 25 and 26 illustrate processes for removing the gate insulating film 36 exposed by the groove 58 after forming a fourth photosensitive film P2. This process is the same process as that used to perforate the focus gate insulating film 40 illustrated in FIGS. 23 and 24.

Referring to FIG. 26, a hole 60 perforating gate insulating film 36 is formed using fourth photosensitive film P2 as a wet etch mask. By forming hole 60 that exposes transparent electrode 32, the gate stack including the second mask layer 34, the gate insulating film 36, the gate electrode 38, the focus gate insulating film 40, and the focus gate electrode 42 is completed. The hole 60 corresponds to the contact hole 44 depicted in FIG. 2. Afterward, the remaining portions of the fourth photosensitive film P2 used for wet etching the exposed portion of the gate insulating film 36 is removed.

Figure 27:
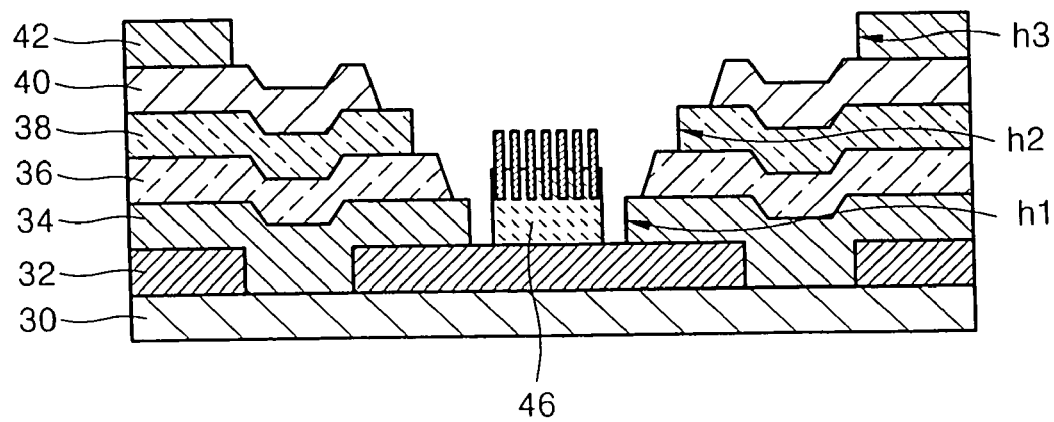

After removing the fourth photosensitive film P2, as shown in FIG. 27, a CNT emitter 46 is formed on the newly exposed portion of the transparent electrode 32 exposed by through the hole 60. CNT emitter 46 is formed using a screen printing method. It is desirable that the CNT emitter 46 is formed in the center of the exposed portion of the transparent electrode 32 and formed not to contact the gate stacks around the CNT emitter 46. Afterward, the rest of the CNT FED display 100 can be manufactured according to a general process.

Figure 33:
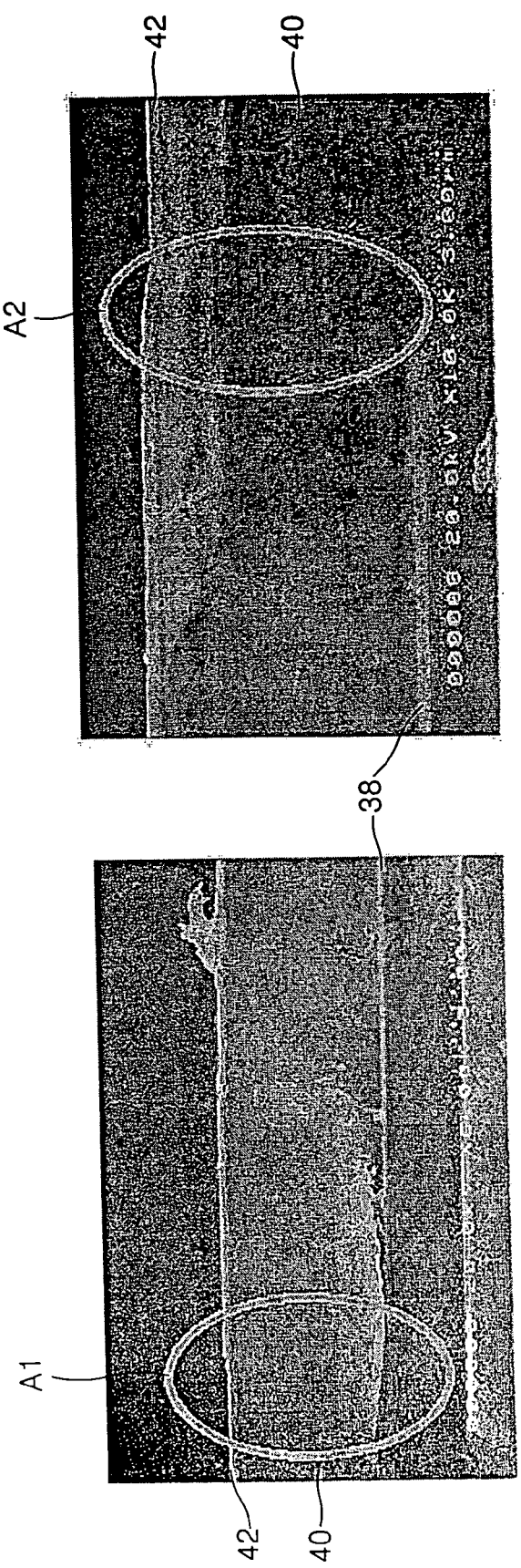
FIG. 33 is SEM images showing a stack of a gate electrode, a focus gate insulating film, and a focus gate electrode formed according to the method of manufacturing the FED depicted in FIGS. 18 through 27.

FIG. 33 shows SEM images of different portions of the gate electrode 38, the focus gate insulating film 40, the gate insulating film 36, and the focus gate electrode 42 of the CNT FED 100 shown in FIG. 2. Referring to FIG. 33, reference character A1 represents a first step between the gate electrode 38 and the focus gate electrode 42, and A2 represents a second step. The step coverages of the first and the second steps A1 and A2 illustrated in FIG. 33 are excellent. Also, no defects that can cause a leakage current are observed in the first and second steps A1 and A2.

Figure 34:
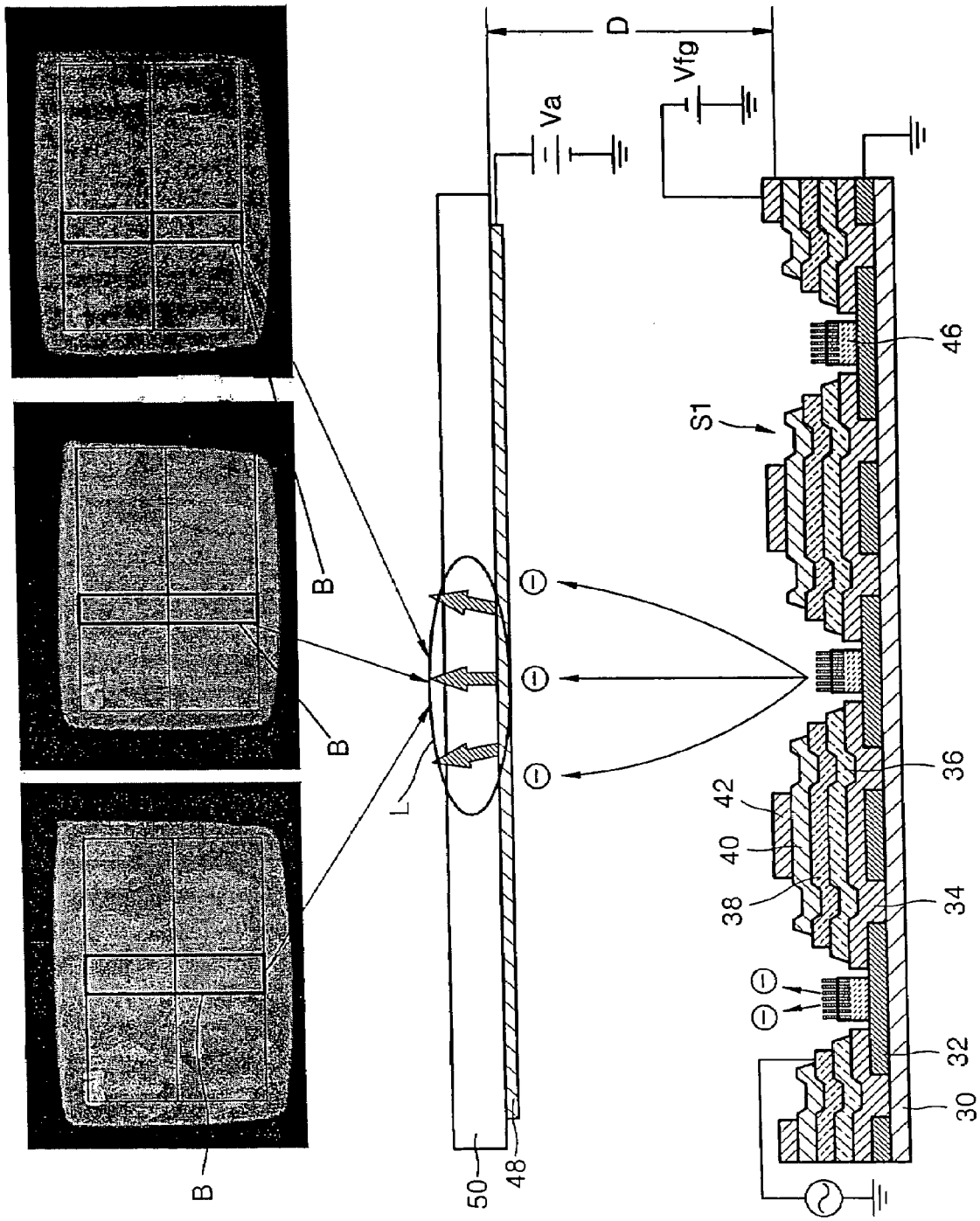
FIG. 34 is a schematic diagram illustrating display characteristics of the FED depicted in FIG. 2 according to a voltage applied to a focus gate.

FIG. 34 is a schematic diagram illustrating electron beam focusing characteristics according to the voltage applied to the gate electrode 38 of the CNT FED depicted in FIG. 2. Referring to FIG. 34, a left picture, a middle picture, and a right picture illustrates the electron beam focusing characteristics when 0 V, −20V, and −40V respectively are applied to the gate electrode 38. Reference character "B" in each picture represents a region on which light L emitted from the fluorescent film 48 is displayed. Referring to FIG. 34, it is seen that the electron beam focusing characteristics increase with increased voltage magnitude applied to the gate electrode 38.

The CNT FED 100 according to the exemplary embodiments of the present invention includes a focus gate insulating film 40 with a thickness of at least 2 μm between a focus gate electrode 42 and a gate electrode 38. The focus gate insulating film 40 has superior step coverage for a step portion, and does not generate defects such as cracks that can cause a leakage current. Also, since the focus gate insulating film 40 is thick, a gap between the focus gate electrode 42 and the gate electrode 38, which is measured along the inner walls of a hole formed in the gate stack, is increased. Accordingly, leakage current between the focus gate electrode 42 and the gate electrode 38 caused by impurities adhered to side walls of the focus gate insulating film 40 during a manufacturing process, is reduced. As a result, overall leakage current between the focus gate electrode 42 and the gate electrode 38 is significantly reduced.

In the method of manufacturing the CNT FED 100 according to the present invention, after forming a mask layer 34 that defines a transparent electrode region for forming a CNT emitter 46 between the transparent electrode 32 and the gate insulating film 40, a photosensitive film coated on the region for forming the CNT emitter is patterned by irradiating ultra violet rays from below the transparent electrode 32. An additional mask that defines the exposure region is unnecessary because the exposure region is already defined by the mask layer 34. That is, the exposure region is self-aligned by the mask layer 34, thereby simplifying the manufacturing process and reducing costs.

In the method of manufacturing the CNT FED 100 according to the present invention, while the focus gate insulating layer 40 is formed of a silicon oxide film in the embodiments disclosed herein, the focus gate insulating layer 40 can be formed of any other appropriate insulating film having a sufficient thickness. Furthermore, the focus gate electrode 42 can also be formed asymmetrically with respect to the CNT emitter 46.

While the present invention has been particularly shown and described with reference to exemplary embodiments thereof, it will be understood by those of ordinary skilled in the art that various changes in form and details may be made therein without departing from the spirit and scope of the present invention as defined by the following claims.

What is claimed is:

1. A carbon nanotube field emission display (CNT FED), comprising:
   a glass substrate;
   a transparent electrode arranged on the glass substrate;
   a mask layer patterned on the transparent electrode;
   a CNT emitter arranged on an exposed portion of the transparent electrode;
   a gate stack arranged on the transparent electrode and on the glass substrate, the gate stack being comprised of a mask layer patterned and arranged on the transparent electrode, a gate insulating film, a gate electrode, a focus gate insulating film (SiOx, X<2), and a focus gate electrode sequentially arranged on the transparent electrode and the glass substrate, the gate stack being arranged on a periphery of the CNT emitter;
   a front panel arranged above the gate stack on which an information is displayed; and
   a fluorescent film arranged on a back surface of the front panel.

2. The CNT FED of claim 1, the gate insulating film being a silicon oxide film ($SiO_x$, where X<2).

3. The CNT FED of claim 1, the focus gate insulating film having a thickness of 3~15 μm.

4. The CNT FED of claim 2, the gate insulating film having a thickness of 1~5 μm.

5. The CNT FED of claim 1, a plurality of CNT emitters correspond to one focus gate electrode.

6. A method of manufacturing a CNT FED, comprising:
   providing a glass substrate, a transparent electrode arranged on the glass substrate, a CNT emitter arranged on the transparent electrode, a gate stack arranged on a peripheral area of the CNT emitter, a front panel arranged above the gate stack and on which an information is displayed, and a fluorescent film arranged on a back surface of the front panel, wherein forming the gate stack comprises:

forming a mask layer perforated by a through hole that exposes a portion of the transparent electrode on the glass substrate;

forming a gate insulating film that fills the through hole in the mask layer;

forming a gate electrode on the gate insulating film and around the through hole;

forming a focus gate insulating film (of SiOx, where x<2) on the gate insulating film;

forming a focus gate electrode on the focus gate insulating film and around the through hole; and removing a portion of the gate insulating film by:
coating a photosensitive film on a resultant product from which the portion of the focus gate insulating film has been removed;
exposing a portion of the photosensitive film formed over the through hole from a back surface of the glass substrate;
removing the exposed portion of the photosensitive film;
wet etching the gate insulating film using the photosensitive film in which the exposed portion is removed as an etch mask;
removing remaining portions of the photosensitive film; and
removing a portion of the focus gate insulating film that lies within the gate electrode.

7. The method of claim 6, wherein the gate insulating film is formed with one of a silicon dioxide film ($SiO_2$) and a silicon oxide film ($SiO_x$, X<2).

8. The method of claim 6, wherein the focus gate insulating film is formed to a thickness of 3~15 μm.

9. The method of claim 7, wherein the gate insulating film is formed to a thickness of 1~5 μm.

10. The method of claim 6, wherein a flow rate of silane ($SiH_4$) for forming the focus gate insulating film is maintained at 50~700 sccm.

11. The method of claim 6, wherein a flow rate of nitric acid ($N_2O$) during formation of the gate insulating film is maintained at 700~4,500 sccm.

12. The method of claim 6, wherein a process pressure is maintained at 600~4,200 mTorr during formation of the focus gate insulating film.

13. The method of claim 6, wherein a temperature of the substrate is maintained at 250~450° C. while forming the focus gate insulating film.

14. The method of claim 6, wherein an RF power is maintained at 100~300 W while forming the focus gate insulating film.

15. The method of claim 7, wherein a flow rate of silane ($SiH_4$) for forming the gate insulating film is maintained at 50~700 sccm.

16. The method of claim 7, wherein a flow rate of nitric acid ($N_2O$) for forming the gate insulating film is maintained at 700~4,500 sccm.

17. The method of claim 6, wherein removing a portion of the focus gate insulating film comprises:
coating a photosensitive film on the focus gate electrode and the focus gate insulating film formed within the focus gate electrode;
exposing the photosensitive film formed above the through hole;
removing the exposed portion of the photosensitive film;
wet etching the focus gate insulating film using the photosensitive film from which the exposed portion is removed as an etch mask; and
removing remaining portions of the photosensitive film.

18. The method of claim 17, wherein the coating, exposing, removing, wet etching and removing steps are repeated at least once.

19. The method of claim 17, wherein the photosensitive film is exposed to ultra violet rays from below the glass substrate during the exposing of the photosensitive film.

20. The method of claim 17, wherein exposing the photosensitive film comprises:
arranging a mask having a transmission window that corresponds to the through hole in the mask layer, the mask being located over the photosensitive film; and
irradiating light toward the mask from above the mask and through the transmission window and onto a portion of the photosensitive film.

21. The method of claim 6, wherein the removing, coating, exposing, wet etching and removing is repeated at least once.

22. The method of claim 6, wherein the photosensitive film is exposed to ultra violet rays from below the glass substrate during the exposing the photosensitive film.

23. The method of claim 6, wherein exposing the photosensitive film comprises:
arranging a mask having a transmission window to a region corresponding to the through hole, the mask being located over the photosensitive film; and
irradiating lights toward and through the transmission window in the mask from above the mask and onto a portion of the photosensitive film.

24. The method of claim 6, wherein the focus gate electrode is perforated by a plurality of through holes.

* * * * *